United States Patent

Farr

[11] 4,313,302
[45] Feb. 2, 1982

[54] HYDRAULIC POWER BOOSTERS FOR VEHICLE BRAKING SYSTEMS

[75] Inventor: Glyn P. R. Farr, Leek Wootton, England

[73] Assignee: Girling Limited, Birmingham, England

[21] Appl. No.: 182,581

[22] Filed: Aug. 29, 1980

Related U.S. Application Data

[63] Continuation of Ser. No. 907,584, May 19, 1978, abandoned.

[30] Foreign Application Priority Data

May 19, 1977 [GB] United Kingdom ............... 21047/77
Oct. 5, 1977 [GB] United Kingdom ............... 41350/77

[51] Int. Cl.³ .............................................. B60T 13/00
[52] U.S. Cl. .................................. 60/547 R; 60/589; 91/391 R; 91/460
[58] Field of Search ............... 60/547 R, 547 A, 548, 60/550, 555, 556, 589; 91/460, 391 R

[56] References Cited

U.S. PATENT DOCUMENTS

| | | | |
|---|---|---|---|
| 3,188,796 | 6/1965 | French | 60/548 |
| 3,786,636 | 1/1974 | Kobashi | 60/548 |
| 3,915,066 | 10/1975 | Thomas | 91/460 |
| 3,921,502 | 11/1975 | Laver | 91/460 |
| 3,958,423 | 5/1976 | Hayashida | 60/556 |
| 4,072,011 | 2/1978 | Ewald | 60/555 |

FOREIGN PATENT DOCUMENTS 1016036  1/1966  United Kingdom .................. 60/547

Primary Examiner—Abraham Hershkovitz
Attorney, Agent, or Firm—Scrivener, Clarke, Scrivener and Johnson

[57] ABSTRACT

An hydraulic booster in which a control chamber is defined between an input piston and a second piston relative to which the input piston is movable, and recuperation valve for controlling communication between the control chamber and a reservoir is located in the control chamber. The recuperation valve closes upon relative movement of the input piston towards the second piston, further movement of the input piston in the same direction causing pressurization of fluid trapped in the control chamber.

12 Claims, 5 Drawing Figures

HYDRAULIC POWER BOOSTERS FOR VEHICLE BRAKING SYSTEMS

This application is a continuation of application Ser. No. 907,584, filed May 19, 1978, now abandoned.

SPECIFIC DESCRIPTION

This invention relates to a new or improved hydraulic booster for a vehicle braking system, the booster being of the kind in which a boost piston working in a bore in a housing is adapted to actuate a master cylinder piston, and the housing is provided with a boost chamber for subjecting the boost piston to hydraulic pressure, the booster incorporating a boost-pressure control valve for controlling a supply of hydraulic pressure fluid to the boost chamber in which the boost-pressure control valve is responsive to pressure in a control chamber in the housing of which pressurisation is controlled by means of a pedal-operated input piston.

In one known booster of the kind set forth the control chamber is positioned adjacent to the boost chamber so that a single failed seal will provide direct communication between the control chamber and the boost chamber, trapping high pressure hydraulic fluid so that the booster will be uncontrollable and the brakes cannot be released.

According to our invention in a booster of the kind set forth the control chamber is defined between the input piston and a second piston relative to which the input piston is movable, and a recuperation valve for controlling communication between the control chamber and a reservoir is located in the control chamber, the recuperation valve closing upon relative movement of the input piston towards the second piston, further movement of the input piston in the same direction causing pressurisation of fluid trapped in the control chamber.

When the boost pressure control valve is open the sum of the applied input and boost pressures acting on the boost piston is applied to the master cylinder piston.

A reservoir chamber is disposed between a recuperation port for connection to the reservoir and the recuperation valve, that is to say between the control chamber and the boost chamber. This ensures that there can be no direct communication between the control and boost chamber through a single failed seal.

The second piston may be disposed between the input piston and the boost piston so that the input piston can act through it onto the boost piston in the event of failure of the supply of hydraulic pressure fluid. In such a construction the input piston and the second piston can work in a common bore in the housing, with the second piston being adapted to act on the boost piston through a thrust member of reduced diameter which works through an opening in a partition between that bore and a second axially spaced bore in the housing in which the boost piston works.

Preferably the input piston extends through a bore in the boost piston and into a blind bore in the second piston in which it works and the second piston comprises the output piston, the control chamber being defined by the portion of the blind bore which is in advance of the input piston, and the recuperation valve controlling communication between the control chamber and the reservoir chamber through recuperation passages in the input piston.

The output piston is preferably separate from the boost piston and works in a bore of constant diameter which is co-axial with the bore in which the boost piston works and with the bore in the output piston in which the input piston works.

Preferably the boost piston comprises a stepped piston working in a stepped portion of the bore and having a through-bore through which the input piston works to operate the recuperation valve with the output piston working in the portion of the stepped bore which is of greater diameter. The input piston preferably has an enlarged abutment for direct engagement with the boost piston in the event of failure of the boost chamber or high pressure source.

The input piston may carry one or more seals for sealing engagement in the bores in which it works. As it only moves a very small distance relative to the boost piston to close the recuperation valve and pressurise fluid in the control chamber to operate the boost pressure control valve, subsequently moving with the boost piston, the seal or seals do not slide in the bore or bores to any significant extent and in practice it is found that they only "twitch" slightly on initial movement of the input piston. Thus, the input piston seals may be low friction seals as they do not have to be durable enough to withstand the master cylinder stroke.

The input piston may alternatively slide with clearance in the boost piston bore and carry a seal on its abutment for sealing engagement with the housing bore.

As the recuperation valve moves with the input and output pistons, the pressure in the control chamber can be exhausted to reservoir at any part of a brake applying stroke. Thus, the recuperation valve opens to exhaust the control chamber as soon as the applied pedal load is released, and the brakes are released more or less immediately.

When the boost-pressure control valve is closed the boost chamber is preferably exhausted to a reservoir different from that for the control chamber. This prevents aerated fluid from the high pressure fluid sourse being supplied to the control chamber and otherwise affecting the hydrostatic fluid in the control chamber.

The reservoir chamber is specifically defined within the input piston and the output piston, between the control chamber and the boost chamber. A second reservoir chamber is located between a connection from the control chamber to the control valve and a connection from the control valve to the boost chamber. A reservoir chamber at atmospheric pressure is therefore located between two high pressure regions. This ensures that in the event of a seal failure high pressure fluid will be exhausted to a respective one of the reservoirs.

In both constructions the pressure applied to the boost chamber when the boost-pressure control valve is open also acts on the end of the control valve in opposition to the applied pressure from the control chamber. Alternatively the master cylinder pressure may be applied to the end of the boost-pressure control valve in opposition to the applied input pressure from the control chamber. When the opposing pressure acting on the boost-pressure control valve equals the applied input pressure the control valve moves to a null position in which both an inlet port and an exhaust port are cut-off from the boost chamber. This provides a positive opening and closing force for the control valve.

The boost-pressure control valve may comprise a spool working in a second bore in the housing and actuated by a stepped control piston working in the second bore and exposed at one end to the pressure in the control chamber. A resilient connection such as a Belleville spring assembly may be provided between the control piston and the boost-pressure control valve and acts substantially to prevent valve flutter.

When a second reservoir chamber is provided the control valve controls communication between the inlet port and a connection between the second bore and the boost chamber and between the boost chamber connection and the second reservoir chamber which is located in the second bore between the end exposed to the control chamber pressure and the boost chamber connection.

The booster is generally operated from a high pressure source such as an accumulator which is also to be used as a power source for a levelling system and thus must have a relatively high pressure.

Several embodiments of our invention are illustrated by way of example in the accompanying drawings in which.

Figure 1:
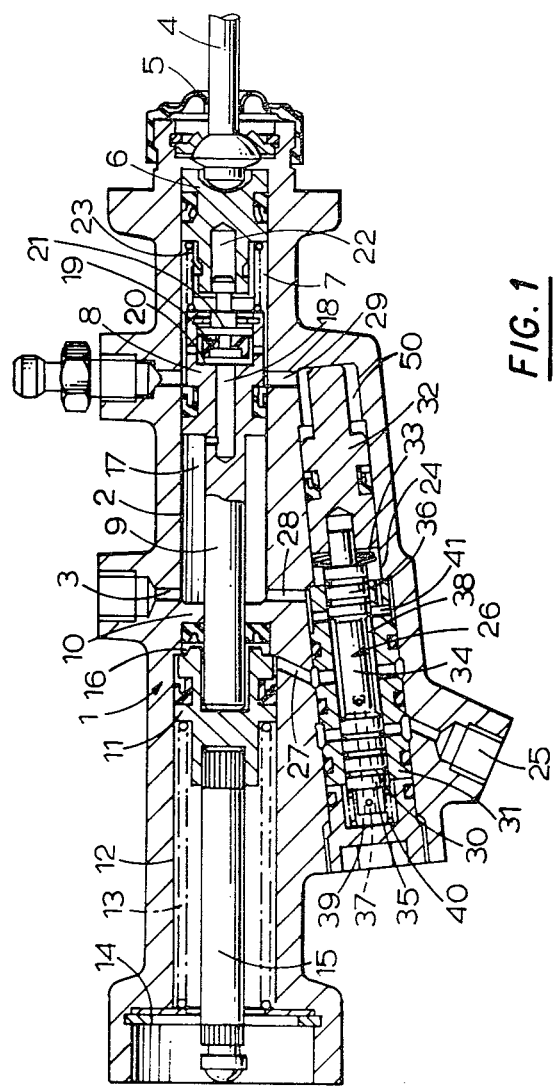
FIG. 1 is a longitudinal section through an hydraulic booster for a vehicle hydraulic braking system.

In the hydraulic booster illustrated in FIG. 1 of the drawings a housing 1 incorporating a booster assembly has a first longitudinally extending blind bore 2 provided with an exhaust port 3 for connection to a reservoir for hydraulic fluid (not shown). A pedal operated input member 4 works through a seal 5 at one end of the bore 2 and acts on an input piston 6 working in the bore. The input piston 6 is of relatively large diameter to accommodate the articulated angular movement of the input member. A control chamber 7 is defined in the bore 1 between the input piston 6 and one end of a second piston 8 working in a constant diameter bore portion with the input piston 6. The opposite end of the piston 8 carries an integral piston rod 9 of reduced diameter. The rod 9 works through a sealed closure 10 for the inner end of the bore 2 and at its free end is engageable with a boost piston 11 working in a second bore 12 in the housing 1 co-axial with, and of a slightly larger diameter than, the first bore 2. A return spring 13 acts between the boost piston 11 and an annular plate 14 at the opposite end of the bore 12 and through which an output rod 15 carried by the piston 11 projects to operate a master cylinder for actuating the brakes of a vehicle.

An annular boost chamber 16 is defined in the bore 12 between the boost piston 11 and the closure 10, and a reservoir chamber 17 in which the port 3 is located is defined in the bore 2 between the second piston 8 and the closure 10.

The reservoir chamber 17 communicates with an axial bore 18 in the second piston 8 and a recuperation valve 19 located in the control chamber 7 and carried between the input piston 6 and the boost piston 8 is adapted to engage a seating 20 at the end of the bore 18 to control communication between the reservoir chamber 17 and the control chamber 7.

The recuperation valve 19 includes a headed stem 21 which is guided to slide in a blind bore 22 in the input piston 6. A compression spring 23 acts in the inoperative position shown in the drawing to urge the recuperation valve 19 into the open position in which it is spaced from the seating 20 so that the reservoir communicates with the control chamber 7.

A third, stopped, bore 24 in the housing 1 extends at an angle to the bores 2 and 12 and has an inlet port 25 for connection to a source of hydraulic fluid under pressure, such as an accumulator. A boost-pressure control valve 26 working in the second bore 24 controls communication between the inlet port 25 and a first connecting passage 27 providing a connection between the bore 24 and the annular boost chamber 16. A second connecting passage 28 provides a connection between the third bore 24 and the reservoir chamber 17, and a third passage 29 connects the control chamber 7 to a chamber 50 at the blind end of the bore 24.

The boost-pressure control valve 26 comprises a valve spool 30 working in a sleeve 31 and a stepped valve control piston 32 acting on one end of the spool valve 30 through a resilient connection comprising a Belleville or other spring assembly 33. The spool valve 30 comprises a stem portion 34 provided at opposite ends with head portions 35, 36 which control communication between a series of ports in the sleeve 31. A drilled passage 37 in the spool 30 connects a bore portion 38 surrounding the stem portion 34 with a chamber 39 at the end of the valve spool 30 which is remote from the control piston 32. The valve spool 30 is normally urged by a return spring 40 acting on the end of the spool 30 into the position shown in the drawings, in which the inlet port 25 is cut-off from the first passage 27 by the head portion 35 and the bore portion 38 is in communication with the reservoir chamber 17 through the second passage 28 and a radial port 41 in the sleeve 31.

When the brake pedal is depressed to actuate the booster the input piston 6 is moved inwardly and the recuperation valve 19 engages the seating 20 to cut-off communication between the reservoir and the control chamber 7. Thereafter fluid in the control chamber 7 is pressurised and there is substantially no relative movement between the input piston and second piston 8 as they work in a constant diameter bore portion. Pressurised fluid in the control chamber 7 is fed via the connecting passage 29 to the chamber 50 and acts on the piston 32 to urge it and the valve spool 30 towards the opposite end of the bore 24. The head portion 36 covers the radial port 41 in the sleeve 31 to cut-off the reservoir chamber and the head portion 35 moves to uncover a radial port 41 in the sleeve 31 which connects the inlet port 25 to the bore portion 38 and through the first passage 27 to the annular boost chamber 16. Pressurised fluid from the supply then acts on the boost piston 11 so that the sum of the applied input pressure and the boost pressure is transmitted to the master cylinder through the output rod 15.

The control chamber pressure available for operating the control valve 26 will be fairly low due to the relatively large diameter of the input piston 6. It is not possible to reduce the diameter of the input piston 6 as it must be of sufficient size to accommodate the articulating movement of the input member 4 with the pedal. Thus the control valve 26 must be designed so that a relatively low control pressure will control the relatively high pressure at the inlet port 25. This is done by making the diameter of the control piston 32 greater than that of the valve spool 30, suitably about three times greater. This provides an effective and sensitive control of the valve spool 30 although the control pressure is low.

After the control valve 26 opens the pressurised fluid supplied through the inlet port 25 to the bore portion 38 is also fed through the drilled passage 37 to the chamber 39 at the end of the spool valve 30 to provide a reaction in opposition to the input pressure in the chamber 50 acting on the control piston 32. When the forces acting on the opposite ends of the spool valve 20 due to the boost pressure in chamber 39 and the applied pressure in the chamber 50 are substantially equal the spool valve moves back to a null position with both radial ports 40 and 41 closed so that the pressure supply and reservoir are cut-off from the bore portion 38 and the booster chamber 16 is isolated. Thus a positive closing of the boost pressure control valve is provided. In an alternative embodiment the drilled passage 37 may be omitted and the master cylinder pressure can be applied directly to the end of the spool valve 30.

Figure 2:
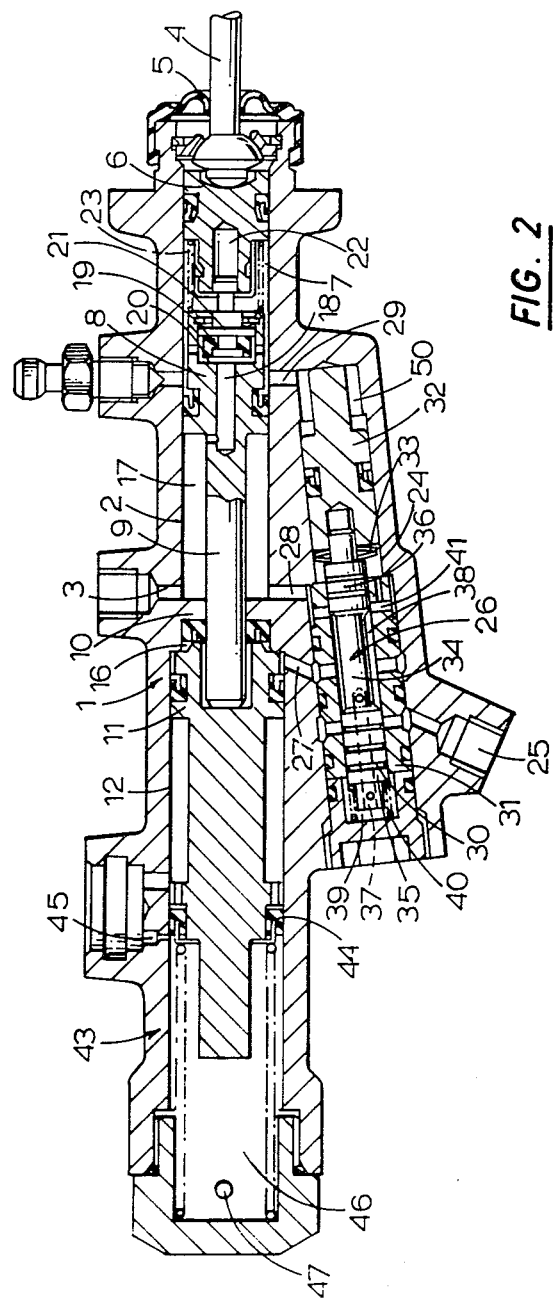
FIG. 2 is a longitudinal section through a modified booster.

The embodiment shown in FIG. 2 shows a minor modification of the embodiment of FIG. 1 and the same reference numerals have been used for identical parts which operate in the same way. In this embodiment the output rod 9 is omitted and the boost piston 8 is extended axially into the bore of a master cylinder assembly 43 and carries a seal 44 at its forward end which is normally spaced from a radial recuperation port 45 for connection to a reservoir for hydraulic fluid. A pressure space 46 in the bore is adapted to be connected to the front wheel brake actuators through an outlet port 47. The boost pressure from the boost chamber 16 may be applied directly to the rear wheel brake actuators. Thus, if the boost pressure fails, the front wheel brakes will be applied directly through the input force transmitted to the boost piston 11, but the rear wheel brakes will fail. This construction is particularly suitable for a braking system incorporating an anti-skid assembly in the rear wheel brakes only as the brake fluid can be directly dumped to the reservoir if a skid signal is received.

The embodiment shown in FIG. 2 is also suitable for applying a tractor wheel brake. In this case there will be no connection to the rear wheel brakes and the pressure space 47 will be connected to one of the tractor brakes, with an identical system for applying the other brake.

In both of the embodiments described above a positive "push-through" application will be provided in the event of failure of the power supply through the inlet 25 or in the control chamber 7. In the event of failure of the supply to the inlet 25 the input piston force from the second piston 8 will be supplied through the rod 9 to the boost piston 11 and, in the event of failure of the pressurised control chamber system, the input piston 6 will move to abut the second piston 8 and apply the master cylinder again by the engagement of the rod 9 with the boost piston 11.

Figure 3:
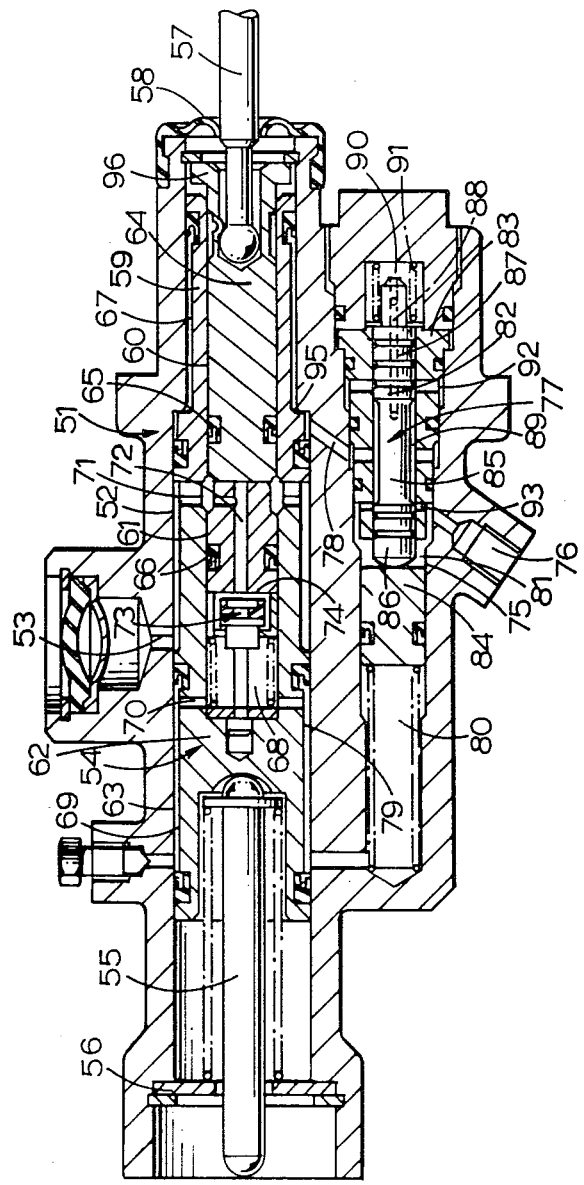
FIG. 3 is a longitudinal section through a further hydraulic booster.

In the hydraulic booster illustrated in FIG. 3 of the drawings a housing 51 incorporating a booster assembly has a first longitudinally extending stepped bore 52 provided with an exhaust port 53 for connection to a first reservoir for hydraulic fluid (not shown). A piston assembly 54 working in the bore acts at one end on an output rod 55 which extends through an annular plate 56 at one end of the bore 52 and is coupled to a master cylinder (not shown) for actuating the brakes of a vehicle. A pedal-operated input member 57 extends through a seal 58 at the other end of the bore 52 to operate the booster.

The piston assembly 54 comprises an annular stepped boost piston 59 with a throughbore 60 communicating with a blind bore 61 in an output or second piston 62. The output piston 62 works in a larger diameter portion 63 of the bore 62 and acts on the output rod 55 at its free end. A two-part input piston 64 works in the bore 60 of the boost piston 59 and extends into the blind bore 61. The input member 57 acts on the input piston 64, and respective spaced seals 65, 66 carried on the input piston 64 seal it in the bores 60 and 61.

In an alternative embodiment the boost piston 59 may be formed integrally with the output piston 62.

An annular boost chamber 67 is defined between a reduced diameter portion of the boost piston 59 and the smaller diameter portion of the bore 52. A control chamber 68 is defined by the portion of the blind bore 61 which is in advance of the input piston 64 and includes an annular chamber 69 communicating with the blind bore 61 through radial passages 70 in the output piston 62. The exhaust port 53 communicates with an annular reservoir chamber 71 which is defined in the bore 52 between the control chamber 68 and the boost chamber 67. The reservoir chamber 71 communicates with an axial recuperation passage 72 in the input piston 64 and a recuperation valve 73 located in the control chamber 68 is carried on the output piston 62 and is adapted to engage a seating 74 at the end of the passage 72 to control communication between the reservoir chamber 71 and the control chamber 68.

A second, stepped, bore 75 in the housing 51 extends parallel to and spaced from the first bore 52 and has an inlet port (not shown) for connection to a source of hydraulic fluid under pressure, such as an accumulator and an exhaust port 76 for connection to a second reservoir (not shown), suitably an accumulator reservoir. A boost pressure control valve 77 working in the second bore 75 controls communication between the inlet port and a first connecting passage 78 providing a connection between the bore 75 and the smaller boost chamber 67. A second connecting passage 79 provides a connection between the control chamber 68 through the radial ports 70, and a chamber 80 at the blind end of the bore 75. A reservoir chamber 81 in which the exhaust port 76 is located is positioned in the bore 75 between the passages 78 and 79.

The boost-pressure control valve 77 comprises a valve spool 82 working in a sleeve 83, and a valve control piston 84 acting on one end of the valve spool 82 comprises a stem portion 85 with head portions 86, 87 at opposite ends controlling communication between a series of ports in the sleeve 83. A drilled passage 88 in the valve spool 82 connects a bore portion 89 surrounding the stem portion 85 with a chamber 90 at the end of the valve spool 82 which is remote from the control piston 84. The valve spool 82 is normally urged by a return spring 91 acting on the end of the valve spool 82 into the position shown in the drawing, in which the inlet port which communicates with an annular chamber 92 in the bore 75 is cut-off from the first passage 78 by the head portion 87 and the bore portion 89 is in communication with the reservoir chamber 81 through a radial port 93 in the sleeve 83.

When the brake pedal is depressed to actuate the booster the input piston 64 moves and the recuperation valve 73 engages the seating 74 to cut-off the reservoir chamber 71 from the control chamber 68. Thereafter, fluid in the control chamber 68 is pressurised and there is substantially no relative movement between the input piston 64 and boost piston 59. The seals 65 and 66 thus only "twitch", rather than slide in the bores 60 and 61. Pressurised fluid in the control chamber 68 is fed via the connecting passage 79 to the control valve piston 84. The pressurised fluid acts on the piston 84 to urge it and the valve spool 82 to the right so that the head portion 86 covers the radial port 93 in the sleeve 83 to cut-off communication with the reservoir chamber 81. The head portion 87 moves to uncover a radial port 94 in the sleeve 83 which connects the annular chamber 92 connected to the inlet port to the bore portion 89 and through the first passage 78 to the annular boost chamber 67. Pressurised fluid from the supply then acts on an annular area 95 at a step in diameter of the boost piston 59 so that the sum of the applied input pressure and the boost pressure is transmitted to the master cylinder through the output piston 62 and output rod 55.

After the control valve 77 opens, the pressurised fluid supplied through the inlet port to the bore portion 89 is also fed through the drilled passage 88 to the chamber 90 at the end of the valve spool 72 to provide a reaction in opposition to the input pressure in the chamber 80 acting on the control piston 84. When the forces acting on the opposite ends of the spool valve 72 due to the boost pressure in chamber 90 and the applied pressure in the chamber 80 are substantially equal the valve spool 82 moves back to a null position with both radial ports 93 and 94 closed. The pressure supply and reservoir chamber 81 are cut-off from the bore portion 89, and the boost chamber 17 is isolated. Thus a positive closing of the boost pressure control valve is provided.

As soon as the applied load on the pedal is released, the recuperation valve opens to exhaust the control chamber 68 and relieve the boost pressure.

An annular abutment shoulder 96 is provided at the outer end of the input piston 64. In the event of failure of any part of the booster, for example the power supply or the control chamber, the shoulder 96 will move to engage the outer end of the boost piston 59 and apply the master cylinder directly with a positive push through, by-passing the delicate boost pressure control valve.

The boost ratio of the booster is given by:

$$1+(A_2A_3/A_1A_4);$$

where $A_1$ is the area of the input piston 64, $A_2$ is the annular area 95 of the boost piston which is exposed to pressure in the boost chamber 67, $A_3$ is the area of the control piston 84 and $A_4$ is the area of the valve spool 82. By making the area of the input 64 equal to the area of the control portion 84, and by making the boost piston three times the area of the spool valve, a boost ratio of about 4 to 1 can be obtained.

Figure 4:
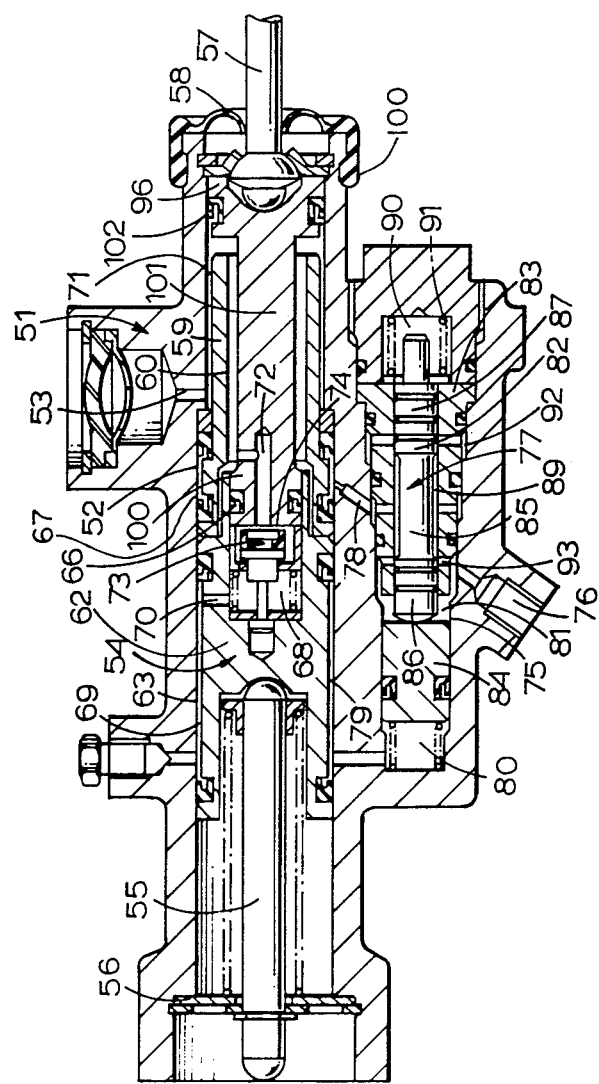
FIG. 4 is a longitudinal section through a booster similar to FIG. 3 but incorporating a modification.

The embodiment shown in FIG. 4 shows a minor modification of the embodiment of FIG. 3 and corresponding reference numerals have been used for identical parts which operate in the same way. The input piston 64 is a one-piece member of stepped diameter with an enlarged diameter portion 100 working in the blind bore 61 of the output piston 62 to define the control chamber and a smaller diameter portion 101 extending with clearance through the boost piston bore 60 to define an annular chamber which forms the reservoir chamber 71 and which is sealed by an annular seal 102 mounted on the annular shoulder 96 of the input piston 64 and is sealing engagement with the bore 2 outboard of the boost piston 59.

Figure 5:
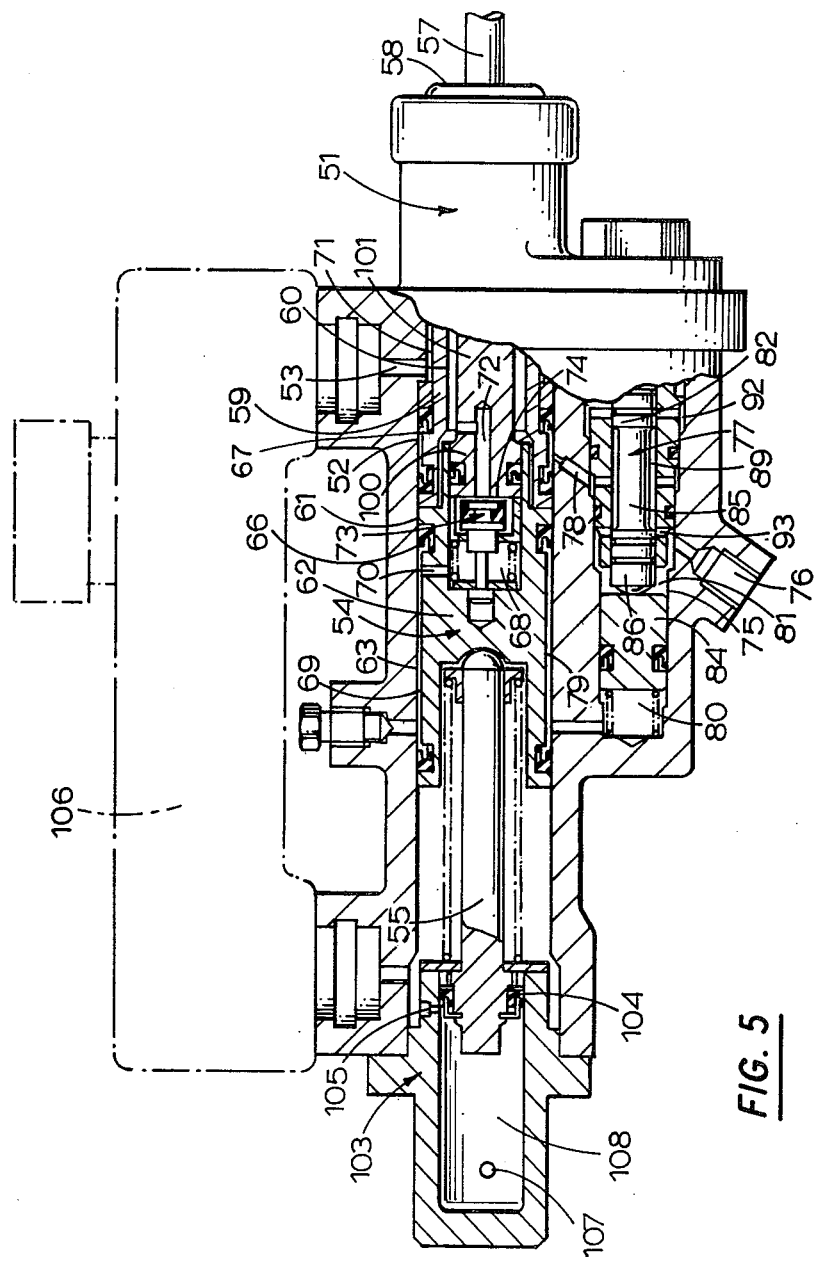
FIG. 5 is a longitudinal section through another modified booster.

The embodiment shown in FIG. 5 shows a minor modification of the embodiment of FIG. 4 and the same reference numerals have been used for identical parts which operate in the same way. In this embodiment the output rod 55 is extended axially into the bore of a master cylinder assembly 103 and carries a seal 104 at its forward end which is normally spaced from a radial recuperation port 105 for connection to a reservoir 106 for hydraulic fluid, which is also connected to the exhaust port 53. A pressure space 108 in the bore is adapted to be connected to the front wheel brake actuators through an outlet port 107.

As in the construction of FIG. 2 the boost pressure may be applied directly to the rear wheel brake actuators. Thus, if the boost pressure fails the front wheel brakes will be applied directly through the input force transmitted to the boost piston 59, but the rear wheel brakes will fail. This construction is particularly suitable for a braking system incorporating an anti-skid assembly in the rear wheel brakes only as the brake fluid can be directly dumped to the reservoir if a skid signal is received.

The embodiment shown in FIG. 5 is also suitable for applying a tractor wheel brake. In this case there will be no connection to the rear wheel brakes and the pressure space 108 will be connected to one of the tractor brakes, with an identical system for applying the other brake.

I clam:

1. An hydraulic booster for a vehicle braking system comprising a housing having a bore, and a boost piston working in said bore to actuate a master cylinder piston, a pedal-operated input piston, and a second piston relative to which said input piston is movable, and said housing is provided with a boost chamber for subjecting said boost piston to hydraulic pressure, and a control chamber is defined between said input piston and said second piston, a boost-pressure control valve being provided for controlling a supply of hydraulic pressure to said boost chamber, said boost-pressure control valve being responsive to pressure in said control chamber, wherein a recuperation valve is located in said control chamber for controlling communication between said control chamber and a reservoir, said recuperation valve closing upon relative movement of said input piston towards said second piston, further movement of said input piston in the same direction causing pressurization of fluid trapped in said control chamber, a reservoir chamber in said housing providing communication between said reservoir and said recuperation valve, first seal means disposed between said boost chamber and said reservoir chamber, second seal means disposed between said control chamber and said reservoir chamber, said seal means being arranged that said control and booster chambers are separated from each other by said reservoir chamber so that upon failure of either of said seal means, fluid from the respective control or boost chamber flows directly into said reservoir chamber and cannot flow from said boost chamber directly into said control chamber or vice versa depending on which of said seal means fails, without first flowing into said reservoir chamber.

2. A booster as claimed in claim 1, wherein said second piston is disposed between said input piston and said boost piston.

3. A booster as claimed in claim 2, wherein said housing has a second bore spaced axially from said first-mentioned bore and in which said input piston and said second piston both work, a partition provided with an opening is disposed between said first-mentioned and said second bores, and a thrust member works through said opening to transmit a thrust from said second piston to said boost piston.

4. A booster as claimed in claim 1, wherein said boost-pressure control valve comprises a spool working in a second bore in said housing and a control piston working in said second bore in said housing for actuating said spool, said control piston being exposed at one end to pressure in said control chamber.

5. A booster as claimed in claim 4, wherein a resilient connection is provided between said control piston and said spool.

6. An hydraulic booster for a vehicle braking system comprising a housing having a bore, and a boost piston working in said bore to actuate a master cylinder piston, a pedal-operated input piston, and a second piston relative to which said input piston is movable, and said housing is provided with a boost chamber for subjecting said booster piston to hydraulic pressure, and a control chamber is defined between said input piston and said second piston, a boost-pressure control valve being provided for controlling a supply of hydraulic pressure to said boost chamber, said boost-pressure control valve being responsive to pressure in said control chamber, wherein a recuperation valve is located in said control chamber for controlling communication between said control chamber and a reservoir, said recuperation valve closing upon relative movement of said input piston towards said second piston, further movement of said input piston in the same direction causing pressurization of fluid trapped in said control chamber, and wherein said boost piston has a through bore, and said second piston comprises an output piston and is provided with a blind bore co-axial with said through-bore, said input piston extending through said through-bore and into said blind bore in which it works, said control chamber being defined by a portion of said blind bore which is in advance of said input piston, and said recuperation valve controlling communication between said control chamber and the reservoir through recuperation passages in said input piston.

7. A booster as claimed in claim 6, wherein said output piston is separate from said boost piston and works in a bore of constant diameter which is co-axial with said bore in which said boost piston works and with said blind bore in said output piston in which said input piston works.

8. A booster as claimed in claim 6, wherein said boost piston comprises a stepped piston working in a stepped portion of said bore and said input piston works through said through-bore to operate said recuperation valve with said output piston working in a said portion of said stepped piston which is of greater diameter.

9. A booster as claimed in claim 6, wherein said input piston has an enlarged abutment for direct engagement with said boost piston in the event of failure of said boost chamber or high pressure source.

10. A booster as claimed in claim 6, wherein said input piston carries at least one seal for sealing engagement in said bores in which said input piston works.

11. A booster as claimed in claim 9, wherein said input piston is adapted to slide with clearance in said through-bore, and said input piston carries a seal on said abutment for sealing engagement with said bore.

12. A booster as claimed in claim 6, wherein said reservoir chamber is specifically defined as being between said input piston and said output piston and between said control chamber and said boost chamber.

* * * * *